(12) United States Patent
Suzuki et al.

(10) Patent No.: US 11,073,191 B2
(45) Date of Patent: Jul. 27, 2021

(54) FLUID-FILLED TUBULAR VIBRATION-DAMPING DEVICE

(71) Applicants: SUMITOMO RIKO COMPANY LIMITED, Komaki (JP); NISSAN MOTOR CO., LTD., Yokohama (JP)

(72) Inventors: Tomomi Suzuki, Komaki (JP); Kouji Nishimoto, Yokohama (JP)

(73) Assignees: SUMITOMO RIKO COMPANY LIMITED, Komaki (JP); NISSAN MOTOR CO., LTD., Yokohama (JP)

( * ) Notice: Subject to any disclaimer, the term of this patent is extended or adjusted under 35 U.S.C. 154(b) by 108 days.

(21) Appl. No.: 16/449,542

(22) Filed: Jun. 24, 2019

(65) Prior Publication Data
US 2019/0309819 A1    Oct. 10, 2019

Related U.S. Application Data

(63) Continuation of application No. PCT/JP2018/008417, filed on Mar. 5, 2018.

(30) Foreign Application Priority Data

Mar. 30, 2017 (JP) .............................. JP2017-068482

(51) Int. Cl.
*F16F 13/14* (2006.01)
*F16F 13/10* (2006.01)
*F16F 13/00* (2006.01)

(52) U.S. Cl.
CPC .......... *F16F 13/1427* (2013.01); *F16F 13/10* (2013.01); *F16F 13/14* (2013.01)

(58) Field of Classification Search
CPC ........ F16F 13/10; F16F 13/14; F16F 13/1427; F16F 13/1481
See application file for complete search history.

(56) References Cited

U.S. PATENT DOCUMENTS

| 7,866,639 B2 | 1/2011 | Endo |
| 2001/0024006 A1* | 9/2001 | Murai ..................... F16F 13/14 |
| | | 267/141 |

FOREIGN PATENT DOCUMENTS

| JP | H06-59644 U | 8/1994 | |
| JP | 09158972 A * | 6/1997 | .............. F16F 13/14 |

(Continued)

OTHER PUBLICATIONS

Oct. 1, 2019 International Preliminary Report on Patentability issued in International Patent Application No. PCT/JP2018/008417.

(Continued)

*Primary Examiner* — Melody M Burch
(74) *Attorney, Agent, or Firm* — Oliff PLC

(57) ABSTRACT

A fluid-filled tubular vibration-damping device including: an inner shaft member; an intermediate tube member spaced radially outward therefrom; a main rubber elastic body connecting the two members; an outer tube member fastened externally onto the intermediate tube member; a pair of fluid chambers formed between the inner shaft member and the outer tube member so as to be on opposite sides of the inner shaft member; and an orifice passage interconnecting the fluid chambers. In at least one of the fluid chambers, at least one of side walls positioned on axially opposite sides includes a thick central connector positioned in a circumferentially central portion of the side wall and extending in an axis-perpendicular direction, and thin flexible walls that are thinner than the central connector while being positioned and spreading on circumferentially opposite sides of the side wall.

4 Claims, 3 Drawing Sheets

(56) References Cited

FOREIGN PATENT DOCUMENTS

| | | | |
|---|---|---|---|
| JP | 10096442 A * | 4/1998 | ............. F16F 13/14 |
| JP | H10-141425 A | 5/1998 | |
| JP | H11-30267 A | 2/1999 | |
| JP | 2001-271865 A | 10/2001 | |
| JP | 2006-132748 A | 5/2006 | |
| JP | 2010-159873 A | 7/2010 | |
| JP | 2013-210011 A | 10/2013 | |

OTHER PUBLICATIONS

May 20, 2020 Office Action issued in Chinese Patent Application No. 201880006386.3.
May 29, 2018 Search Report issued in International Patent Application No. PCT/JP2018/008417.
Jan. 12, 2021 Office Action issued in Japanese Patent Application No. 2017-068482.

* cited by examiner

FLUID-FILLED TUBULAR VIBRATION-DAMPING DEVICE

INCORPORATED BY REFERENCE

This application is a Continuation of International Application No. PCT/JP2018/008417 filed Mar. 5, 2018, which claims priority under 35 U.S.C. §§ 119(a) and 365 of Japanese Patent Application No. 2017-068482 filed on Mar. 30, 2017, the disclosures of which are expressly incorporated herein by reference in their entireties.

BACKGROUND OF THE INVENTION

1. Field of the Invention

The present invention relates to a fluid-filled tubular vibration-damping device in which an inner shaft member and an outer tube member are connected by the main rubber elastic body, and fluid chambers are formed on opposite sides of the inner shaft member. The device exhibits a vibration damping effect with respect to vibration input in the axis-perpendicular direction based on the flow action of the fluid through an orifice passage connecting the fluid chambers.

2. Description of the Related Art

Conventionally, as a vibration damping device which is interposed between two members constituting a vibration transmission system to connect both members in a vibration damping manner, there is known a device in which a non-compressible fluid such as water or an alkylene glycol is sealed inside. As a specific example, as disclosed in U.S. Pat. No. 7,866,639, the sealed fluid is configured to flow by a pressure gradient generated at the time of vibration input. The device utilizes vibration damping effects based on flow action such as resonance action of the fluid.

In particular, the fluid-filled tubular vibration-damping device disclosed in U.S. Pat. No. 7,866,639 has a structure in which an inner shaft member and an outer tube member, which are spaced apart from each other by a prescribed distance in the radial direction, are connected by a main rubber elastic body, and a pair of fluid chambers provided on opposite sides of the inner shaft member are held in communication with each other by an orifice passage. Such a tubular vibration-damping device is used for an automotive member mount for a suspension, an upper support, an engine mount, a body mount, and the like.

Meanwhile, with the vibration damping device, there are cases where various types of input vibrations are input, and it may be difficult to reliably achieve the vibration damping ability required with respect to those vibrations. For example, with a tubular vibration-damping device used for automotive body mounts or the like, in the axis-perpendicular direction which is the vehicle front-back direction, high spring rigidity for support and attenuating capability are required with respect to low-frequency vibrations such as shakes exerted when the automobile drives over a bump or the like. Meanwhile, vibration isolating capability owing to low dynamic spring characteristics may be required with respect to high-frequency vibrations such as road noise exerted during driving.

However, with the fluid-filled tubular vibration-damping device of the conventional structure, when attempting to achieve high spring rigidity for support and attenuating capability with respect to low-frequency vibrations by increasing dynamic spring characteristics in the axis-perpendicular direction which is the vehicle front-back direction, there is a problem that expansion spring rigidity due to the main rubber elastic body constituting the wall part of the fluid chamber may become large, thereby making it difficult to satisfy the vibration damping ability with respect to high-frequency vibrations. Furthermore, fluid flow resistance of the orifice passage tuned to low-frequency vibration becomes extremely large in a high-frequency range due to antiresonance action, and moreover, the expansion spring rigidity of the wall part of the fluid chamber is large. Thus, there is a problem that it may be more difficult to obtain the vibration damping effect with respect to the high-frequency vibrations.

SUMMARY OF THE INVENTION

It is therefore one object of this invention to provide a fluid-filled tubular vibration-damping device of novel structure which is able to achieve excellent vibration damping ability with respect to vibrations in both low-frequency range and high-frequency range in a compatible manner.

A first preferred embodiment of the present invention provides a fluid-filled tubular vibration-damping device comprising: an inner shaft member; an intermediate tube member spaced radially outward from the inner shaft member; a main rubber elastic body connecting the inner shaft member and the intermediate tube member; an outer tube member fastened externally onto the intermediate tube member; a pair of fluid chambers formed between the inner shaft member and the outer tube member, the fluid chambers being formed on opposite sides of the inner shaft member; and an orifice passage through which the fluid chambers are held in communication, wherein in at least one of the fluid chambers, at least one of side walls positioned on axially opposite sides includes a thick central connector positioned in a circumferentially central portion of the side wall and extending in an axis-perpendicular direction, and thin flexible walls that are thinner than the central connector while being positioned and spreading on circumferentially opposite sides of the side wall.

With the fluid-filled tubular vibration-damping device structured following the present preferred embodiment, in the direction in which the fluid chambers are opposed to each other and in which vibrations targeted for damping are to be input, the thick central connector is provided so as to extend astride the inner shaft member and the outer tube member. Therefore, in such direction of vibration input, the central connector is able to effectively exhibit spring rigidity in the direction of compression/tension, thereby obtaining high spring rigidity. Moreover, between the fluid chambers opposed to each other in the direction of vibration input, fluid flow through the orifice passage will take place based on relative pressure fluctuations, and high attenuating effect based on the resonance action of the fluid can also be exhibited. This makes it possible to realize excellent vibration damping performance as a whole.

Meanwhile, since the thin flexible walls are provided on the side wall of the fluid chamber, with respect to pressure fluctuations at the time of input of high-frequency vibration having small amplitude, the flexible walls will exhibit low expansion spring rigidity. Therefore, the pressure in the fluid chamber will be allowed to escape, thereby making it possible to avoid high spring behavior due to fluid pressure, as well as to eliminate high dynamic spring behavior due to antiresonance of the orifice passage.

As a result, with respect to low-frequency, large-amplitude vibrations, excellent vibration damping performance is exhibited by the high spring rigidity owing to the central connector and the high attenuating effect owing to the fluid flow action. Meanwhile, with respect to high-frequency, small-amplitude vibrations, high dynamic spring behavior based on the pressure fluctuations in the fluid chamber will be avoided, thereby exhibiting excellent vibration damping performance owing to the low dynamic spring characteristics.

A second preferred embodiment of the present invention provides the fluid-filled tubular vibration-damping device according to the first preferred embodiment, wherein the flexible walls have a cross-sectional shape curving and extending in the axis-perpendicular direction between the inner shaft member and the outer tube member.

With the fluid-filled tubular vibration-damping device according to the present preferred embodiment, flexibility and hence expansion elasticity of the flexible walls can be set low owing to the shape effect without excessively thinning the wall thickness of the flexible walls. Therefore, it is possible to advantageously obtain improvement effect of the vibration-damping performance with respect to high-frequency vibrations owing to the flexible wall, while improving durability.

A third preferred embodiment of the present invention provides the fluid-filled tubular vibration-damping device according to the first or second preferred embodiment, wherein the at least one of the side walls of the at least one of the fluid chambers includes recesses positioned on the circumferentially opposite sides thereof and opening to an axial outer face thereof, and the flexible walls are provided by the side wall being thin-walled by the recesses, and an axial inner face of the side wall spreads in a circumferential direction with an inner face shape that is constant over the central connector and the flexible walls.

With the fluid-filled tubular vibration-damping device according to the present preferred embodiment, simplification of the parting structure of the mold is facilitated in comparison with the case where the flexible walls are provided by recesses opening to the inner face of the fluid chamber. Besides, it is also possible to allow the axial inner face of the side wall of the fluid chamber to have a smooth surface shape without steps in the circumferential direction. This may improve flow efficiency and hence the vibration damping performance by reducing flow resistance of the sealed fluid.

A fourth preferred embodiment of the present invention provides the fluid-filled tubular vibration-damping device according to any one of the first through third preferred embodiments, wherein in both of the fluid chambers formed on the opposite sides of the inner shaft member, each of the side walls positioned on the axially opposite sides includes the central connector and the flexible walls.

With the fluid-filled tubular vibration-damping device according to the present preferred embodiment, the central connector and the flexible walls are provided on both side walls positioned on the axially opposite sides of both fluid chambers. This makes it possible to more efficiently realize the excellent vibration damping effect based on high attenuation characteristics with respect to the low-frequency vibrations and the excellent vibration damping effect based on low dynamic spring characteristics with respect to the high-frequency vibrations as described above in a compatible manner.

A fifth preferred embodiment of the present invention provides the fluid-filled tubular vibration-damping device according to any one of the first through fourth preferred embodiments, wherein the intermediate tube member includes a pair of windows opening at portions that are opposed to each other in the axis-perpendicular direction in an axially middle portion of the intermediate tube member, the main rubber elastic body includes a pair of pockets opening to an outer circumferential surface of the intermediate tube member through the respective windows thereof, and the windows of the intermediate tube member are covered by the outer tube member so that the fluid chambers are provided by the pockets.

With the fluid-filled tubular vibration-damping device according to the present preferred embodiment, it is possible to provide the pair of fluid chambers with excellent fluidtightness to the external space and with a simple structure. Thus, the fluid-filled tubular vibration-damping device structured following the present invention can be more easily put into practical use.

With the fluid-filled tubular vibration-damping device constructed according to the present invention, with respect to low-frequency, large-amplitude vibrations, excellent vibration damping performance will be exhibited by the high spring rigidity owing to the central connector and the high attenuating effect owing to the fluid flow action. Besides, with respect to high-frequency, small-amplitude vibrations, high dynamic spring behavior based on the pressure fluctuations in the fluid chamber will be avoided, thereby exhibiting excellent vibration damping performance owing to the low dynamic spring characteristics. This makes it possible to achieve excellent vibration damping ability with respect to low-frequency vibrations and high-frequency vibrations in a compatible manner.

BRIEF DESCRIPTION OF THE DRAWINGS

The foregoing and/or other objects, features and advantages of the invention will become more apparent from the following description of a practical embodiment with reference to the accompanying drawings in which like reference numerals designate like elements and wherein.

DETAILED DESCRIPTION OF EMBODIMENTS

Figure 1:
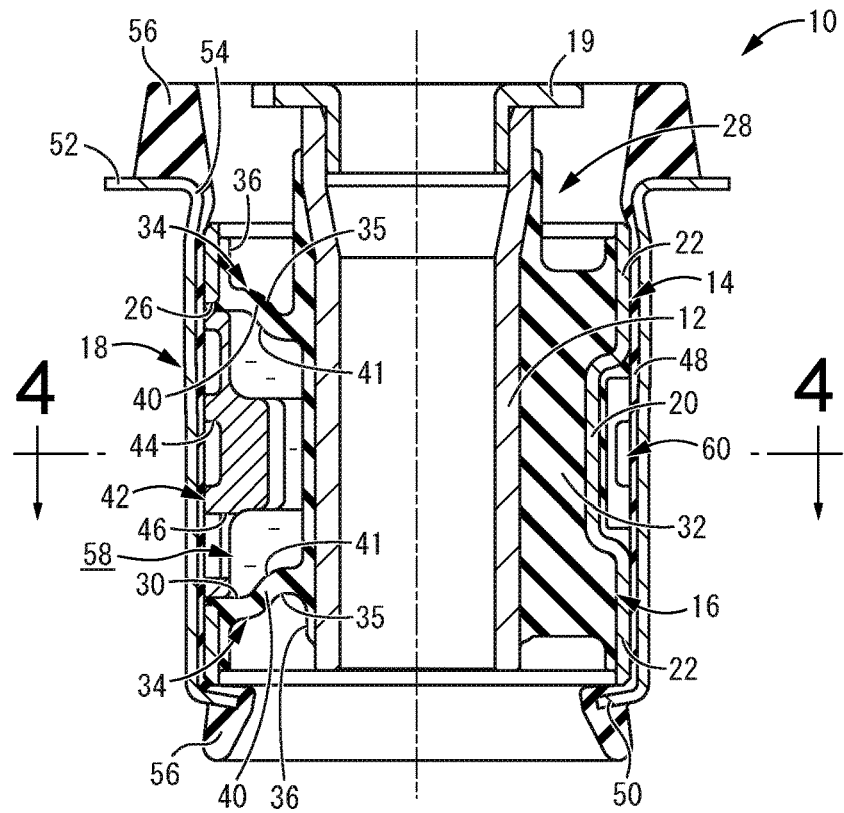
FIG. 1 is a vertical cross sectional view showing a fluid-filled tubular vibration-damping device as a first practical embodiment of the present invention, taken along line 1-1 of FIG. 2.

Hereinafter, practical embodiments of the present invention will be described in reference to the drawings.

FIGS. 1 to 5 show an automotive suspension member mount 10 as a first practical embodiment of a fluid-filled tubular vibration-damping device of construction according to the present invention. The suspension member mount 10 according to the present practical embodiment includes an inner shaft member 12 of metal and an intermediate tube member 14, which are radially spaced apart from each other by a prescribed distance. The inner shaft member 12 and the intermediate tube member 14 are elastically connected by a main rubber elastic body 16. Besides, an outer tube member 18 of metal is externally placed about the intermediate tube member 14 and fastened fitting thereto.

Figure 2:
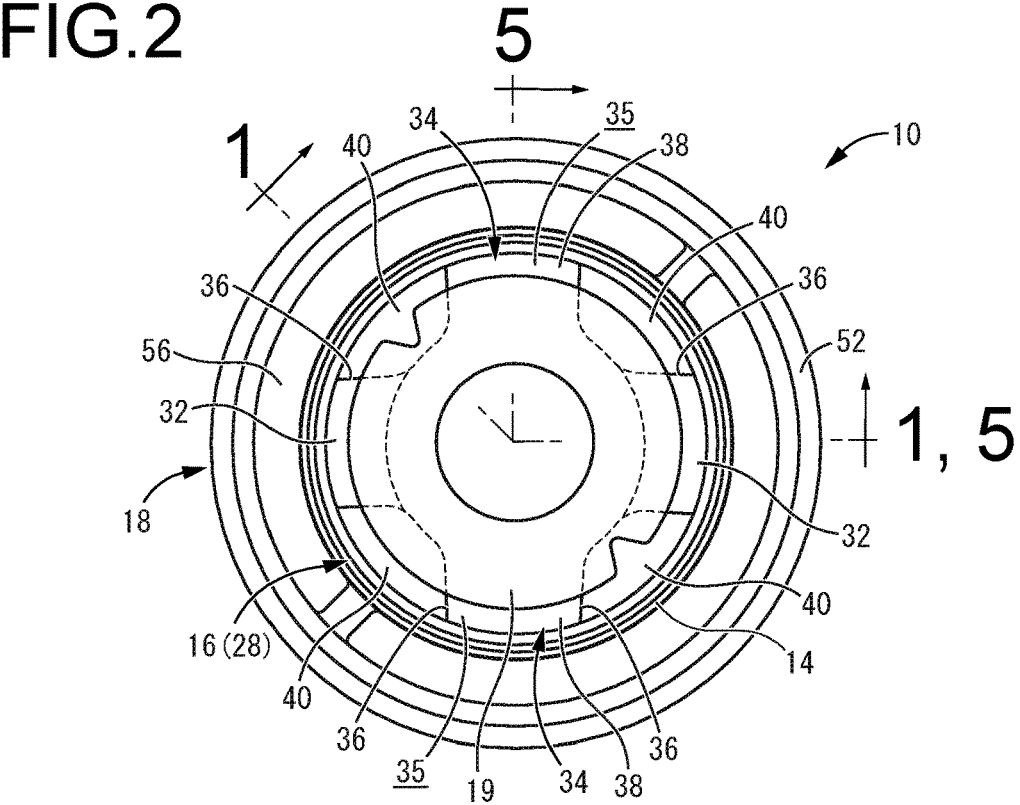
FIG. 2 is a top plan view of the fluid-filled tubular vibration-damping device shown in FIG. 1.
Figure 3:
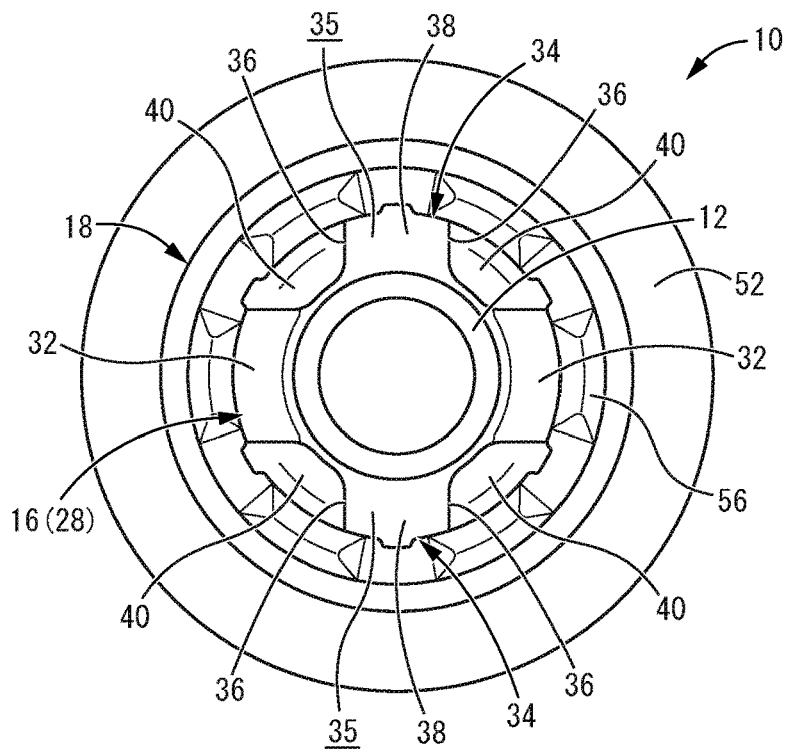
FIG. 3 is a bottom plan view of the fluid-filled tubular vibration-damping device shown in FIG. 1.
Figure 4:
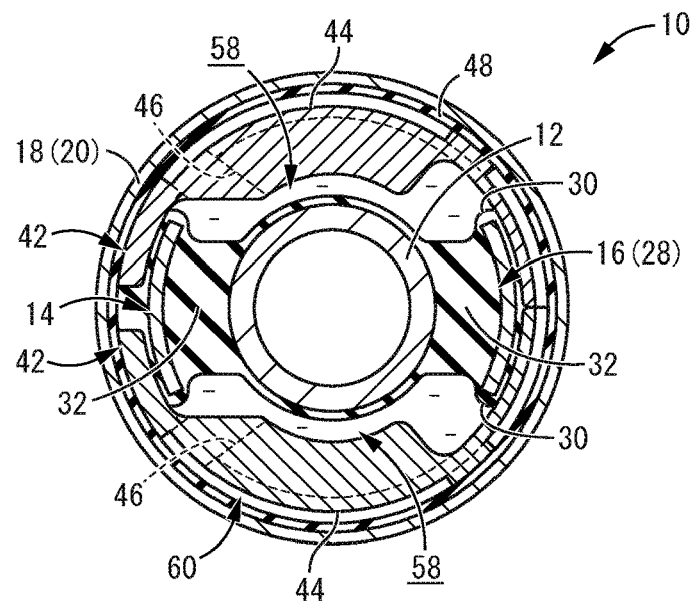
FIG. 4 is a cross sectional view taken along line 4-4 of FIG. 1.
Figure 5:
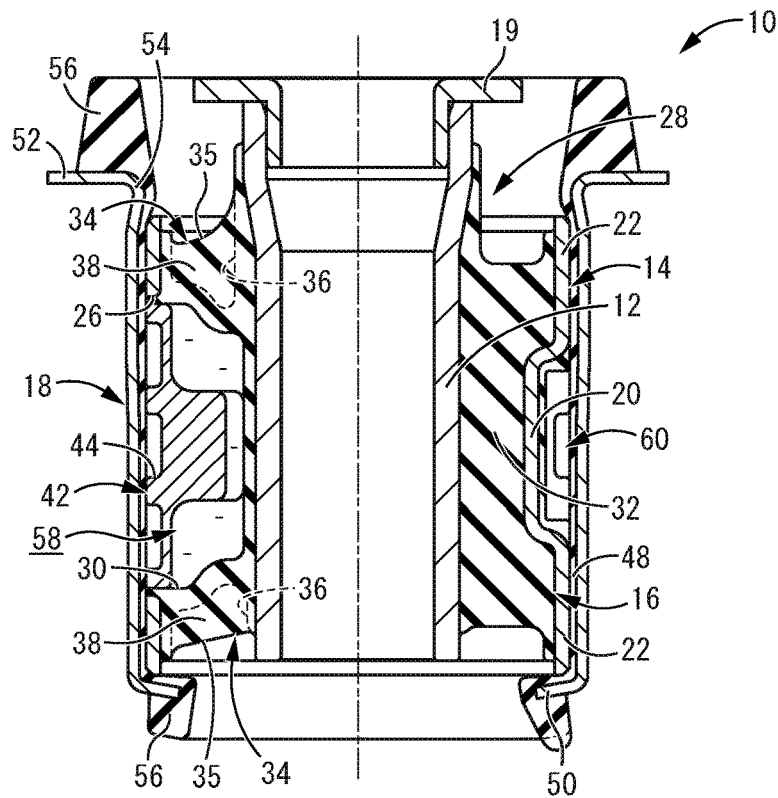
FIG. 5 is a cross sectional view taken along line 5-5 of FIG. 2.

With such member mount 10, the inner shaft member 12 is attached to a vehicle body side in a state in which the vertical direction in FIG. 1 roughly coincides with the vehicle vertical direction, and the vertical direction and the lateral direction in FIGS. 2 and 3 respectively coincide with the front-back direction and the lateral direction of the vehicle. Meanwhile, the outer tube member 18 is attached to a suspension member. By so doing, the member mount 10 is configured to be interposed at the mounting portion of the suspension member to the vehicle body. In the following description, as a general rule, the vertical direction refers to the vertical direction in FIG. 1.

Described more specifically, the inner shaft member 12 has a round tubular shape extending straightly in the vertical direction. In the present practical embodiment, the upper end of the inner shaft member 12 is slightly enlarged in diameter, and a mounting flange 19 is secured by being press-fitted therein. Further, around the inner shaft member 12, the intermediate tube member 14 of metal is disposed radially outward at a prescribed distance in a coaxial manner.

The intermediate tube member 14 has a large-diameter, roughly thin-walled tubular shape overall, and its axially middle portion is reduced in diameter so as to have a groove shape that is continuous in the circumferential direction. Accordingly, the intermediate tube member 14 has a tubular wall including a small-diameter part 20 and large-diameter parts 22, 22 provided on axially opposite sides of the small-diameter part 20. Besides, the intermediate tube member 14 includes in its roughly axially middle portion a pair of windows 26, 26 formed at portions that are opposed to each other in the axis-perpendicular direction, which is the vehicle front-back direction. The windows 26, 26 each extend for a length less than half the circumference.

Figure 6:
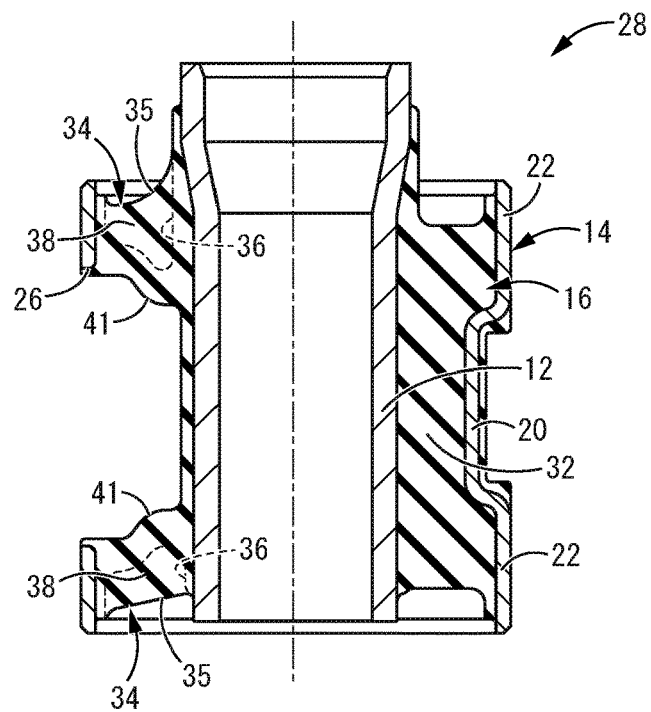
FIG. 6 is a vertical cross sectional view showing an integrally vulcanization molded component of a main rubber elastic body constituting the fluid-filled tubular vibration-damping device shown in FIG. 1, corresponding to the same cross-sectional position as that of FIG. 5.

The main rubber elastic body 16 having a roughly thick-walled, round tubular shape overall is interposed between the radially opposed faces of the inner shaft member 12 and the intermediate tube member 14, and the inner shaft member 12 and the intermediate tube member 14 are elastically connected by the main rubber elastic body 16. As shown in FIG. 6, the main rubber elastic body 16 is formed as an integrally vulcanization molded component 28 in which the inner shaft member 12 and the intermediate tube member 14 are bonded by vulcanization respectively on the inner circumferential surface and the outer circumferential surface of the main rubber elastic body 16.

Moreover, the main rubber elastic body 16 includes a pair of pockets 30, 30 having a depressed form, which are positioned on opposite sides of the inner shaft member 12 in the vehicle front-back direction and each extend for a length less than half the circumference. The pockets 30, 30 open to the outer circumferential surface of the intermediate tube member 14 through the respective windows 26, 26 of the intermediate tube member 14.

Furthermore, each pocket 30 is configured such that the bottom wall of is constituted by the outer circumferential surface of the inner shaft member 12 covered by a thin rubber layer, while the peripheral walls are constituted by the main rubber elastic body 16. Among the peripheral walls, the circumferentially opposite side walls of the pocket 30 are constituted by thick partition wall rubbers 32, 32 which partition the pockets 30, 30. The axial thickness of the partition wall rubber 32 is close to the entire length of the intermediate tube member 14.

Meanwhile, axially opposite side walls 34, 34 of the pocket 30, which partition the axially opposite sides of the pocket 30 with respect to the external space, are provided so as to extend in the circumferential direction between the radially opposed faces of the inner shaft member 12 and the outer tube member 18 (the intermediate tube member 14). Besides, on an axial outer face 35 of each side wall 34, there are formed a pair of recesses 36, 36 which are positioned on the circumferentially opposite sides thereof and open to axially outward.

The circumferentially opposite side portions of the side wall 34 are thin-walled by the recesses 36, 36. Thus, the circumferentially central portion of the side wall 34 is not thin-walled by the recess 36, and constitutes a thick central connector 38 extending in the radial direction between opposed faces of the inner shaft member 12 and the outer tube member 18 (the intermediate tube member 14). On the other hand, the circumferentially opposite side portions of the side wall 34 are made thinner in the axial direction than the central connector 38 by being thin-walled from the axially outer side by the recess 36, and constitute flexible walls 40, 40 being allowed to undergo elastic deformation in the axial direction, which is inside and outside of the pocket 30, more easily than the central connector 38 is.

In the pair of pockets 30, 30, the central connectors 38, 38 of the side walls 34, 34 respectively positioned on the axially opposite sides extend in series in the axis-perpendicular direction with the inner shaft member 12 interposed therebetween. Besides, the flexible walls 40 are provided at positions circumferentially deviated from the axis-perpendicular direction in which the central connectors 38, 38 extend.

Particularly in the present practical embodiment, with respect to the shape of an axial inner face 41 of the side wall 34 of each pocket 30, a sloping part is provided at the middle portion in the depth direction. Thus, the axial inside dimension of the pocket 30 is varied in the depth direction, namely, its opening side is made larger in axial inside dimension than its bottom side. Besides, by the sloping part being provided at the middle portion in the depth direction, the inner face shape of the side wall 34 is curved in a tan (tangent) curve shape in the depth direction, which is the radial direction. The inner face shape of the side wall 34 having such a curved surface shape spreads roughly constantly in the circumferential direction over the central connector 38 and the flexible walls 40, 40 provided on the opposite sides thereof.

Moreover, the bottom face shape of the recess 36 formed in the side wall 34 is curved in the radial direction so as to have a roughly similar shape corresponding to the inner face shape of the side wall 34. Accordingly, the side wall 34 (the flexible wall 40) provided between the bottom parts of the pocket 30 and the recesses 36, 36 spreads while curving in the radial direction and in the circumferential direction with a roughly constant thickness dimension.

Furthermore, on the outer peripheral surface of the integrally vulcanization molded component 28, a pair of orifice members 42, 42 are attached. Each of these orifice members 42, 42 has an arcuate plate shape which is of length less than half the circumference, and is disposed astride the openings of the pair of windows 26, 26 in the circumferential direction. The circumferentially opposite end portions of the orifice member 42 are overlapped on and supported by the opening edge parts on the circumferentially opposite sides of each window 26.

Additionally, the orifice members 42, 42 are provided with grooves 44, 44 opening onto the outer circumferential surface thereof and extending in the circumferential direction. The first circumferential ends of the grooves 44 provided in the respective orifice members 42 communicate with each other. The second circumferential ends of the grooves 44, 44 provided in the respective orifice members 42, 42 communicate with the respective pockets 30, 30 via through holes 46, 46 provided penetrating the bottom walls of the grooves 44, 44.

Then, the outer tube member 18 is externally placed onto the integrally vulcanization molded component 28 to which such orifice members 42, 42 are attached, and is secured fitting thereto by being subjected to a diameter reduction process as needed. A thin seal rubber layer 48 is formed over the roughly entire surface of the inner circumferential surface of the outer tube member 18, and the fitting surfaces to the intermediate tube member 14 and the orifice members 42, 42 are fluid-tightly sealed.

Besides, an inner flange 50 is formed at one axial end of the outer tube member 18, and is engaged with one axial end of the intermediate tube member 14. Moreover, an outer flange 52 is formed at the other axial end of the outer tube member 18, while a constricted part 54 is formed at the radially inner edge part on the proximal side of the outer flange 52 so as to be engaged with the other axial end of the intermediate tube member 14. On the inner flange 50 and the outer flange 52 of the outer tube member 18, cushioning rubbers 56, 56 each projecting axially outward are integrally formed with the seal rubber layer 48.

By the outer tube member 18 being fastened externally onto the integrally vulcanization molded component 28, the openings of the windows 26, 26 are covered by the outer tube member 18, and the openings of the pair of pockets 30, 30 are fluid-tightly covered. Accordingly, a pair of fluid chambers 58, 58, which are opposed to each other with the inner shaft member 12 interposed therebetween in the vehicle front-back direction, are formed by the main rubber elastic body 16 constituting their peripheral walls. That is, the axially opposite wall parts in the fluid chambers 58, 58 are constituted by the side walls 34, 34, 34, 34. Besides, the grooves 44, 44 of the orifice members 42, 42 are also fluid-tightly covered by the outer tube member 18, thereby providing an orifice passage 60 meandering in the circumferential direction along the inner circumferential surface of the outer tube member 18 and extending for a length equal to once around the circumference or more. The fluid chambers 58, 58 are held in communication with each other through the orifice passage 60.

Furthermore, a fluid-filled zone including the fluid chambers 58, 58 and the orifice passage 60, which is fluid-tightly blocked with respect to the external space, is filled with a predetermined non-compressible fluid or liquid. As the non-compressible fluid to be filled, water, alkylene glycols, polyalkylene glycols, silicone oil or the like may be employed, and in particular, in order to effectively obtain the vibration damping effect based on the resonance action of the fluid, a low-viscosity fluid having viscosity of 0.1 Pa·s or lower is preferably employed.

Filling of the non-compressible fluid into the sealed zone can be advantageously accomplished by, for example, attaching the orifice members 42, 42 to the integrally vulcanization molded component 28 of the main rubber elastic body 16, and then carrying out external attachment of the outer tube member 18 within a non-compressible fluid, or the like.

Then, the member mount 10 structured as described above is mounted onto the vehicle in a state in which the vertical direction in FIG. 1 roughly coincides with the vehicle vertical direction, and the vertical direction and the lateral direction in FIGS. 2 and 3 respectively coincide with the front-back direction and the lateral direction of the vehicle.

In this installed state, in the vehicle lateral direction in which a rolling load at the time of turning is exerted, a large spring rigidity is exhibited by the pair of partition wall rubbers 32, 32 positioned between the inner shaft member 12 and the outer tube member 18 (the intermediate tube member 14). This makes it possible to realize good steering stability.

Besides, in the vehicle front-back direction in which low-frequency, large-amplitude vibrations are exerted when driving over a bump, etc., the pair of fluid chambers 58, 58 are opposed to each other with the inner shaft member 12 interposed therebetween. Based on the relative pressure fluctuations induced between the fluid chambers 58, 58, fluid flow through the orifice passage 60 will be produced, and excellent vibration damping performance can be obtained by the high attenuating effect utilizing the resonance action of the fluid.

Particularly in the vehicle front-back direction, the pair of central connectors 38, 38 are disposed at the axially opposite sides so as to connect the inner shaft member 12 and the outer tube member 18 (the intermediate tube member 14) in series. Therefore, the attenuating action by the spring rigidity in the axis-perpendicular direction can also be exhibited. Further, the expansion spring rigidity of the fluid chamber 58 is also sufficiently obtained by the central connector 38. Thus, escape of the pressure fluctuations induced in the fluid chamber 58 at the time of vibration input will be suppressed, thereby efficiently obtaining a sufficient amount of fluid flow through the orifice passage 60. Accordingly, an intended vibration damping effect based on the fluid flow action will be exhibited more stably.

On the other hand, at the time of input of high-frequency, small-amplitude vibration such as driving rumble, the fluid flow resistance through the orifice passage 60 is greatly increased by the antiresonance action of the fluid flow. However, since the expansion spring rigidity of the flexible wall 40 provided to the side wall 34 of each fluid chamber 58 is low, the pressure fluctuations in the fluid chamber 58 can be allowed to escape and reduced by the elastic deformation of the flexible wall 40. As a result, a significant increase in dynamic spring constant will be avoided, thereby achieving good vibration damping performance owing to the low dynamic spring characteristics.

Moreover, the central connector 38 and the flexible walls 40, 40 are provided to each of the side walls 34, 34, 34, 34 on the axially opposite sides of the pair of fluid chambers 58, 58. This makes it possible to even more stably attain vibration damping effect with respect to both the low-frequency, large-amplitude vibration and the high-frequency, small-amplitude vibration.

Furthermore, in the present practical embodiment, the axial inner and outer faces of the flexible wall 40 have the shapes corresponding to each other. Accordingly, the flexible wall 40 has a roughly constant thickness dimension in the axis-perpendicular direction, and can be elastically deformed while reducing the risk of unintended deformation and the like. In particular, since the flexible wall 40 has a curved shape, elastic deformation is further facilitated. Therefore, it is not necessary to make the flexible wall excessively thin in order to easily cause elastic deformation, thereby improving durability as well.

Besides, the thin-walled flexible wall 40 is formed by providing the recess 36 on the axially outer side of the side wall 34. Thus, in comparison with the case where the recess is formed on the axially inner side, removability of the mold may be improved. In addition, by providing the recess 36 on the axially outer side of the side wall 34, it is also possible to form each of the axial inner faces 41 of the both side walls 34, 34 of the fluid chamber 58 so as to spread in the circumferential direction with a roughly constant curved surface shape. Therefore, the fluid in the fluid chambers 58, 58 can smoothly flow, thereby improving the flow efficiency.

Additionally, in the present practical embodiment, the intermediate tube member 14 is provided with the windows 26, 26, and the pockets 30, 30 open to the outer peripheral side through the windows 26, 26. With the simple structure in which the openings of the pockets 30, 30 are covered by the outer tube member 18, the pair of fluid chambers 58, 58 can be formed. In particular, the orifice members 42, 42 having the grooves 44, 44 on its outer peripheral side are fitted in the pockets 30, 30, and by the openings of the grooves 44, 44 being covered by the outer tube member 18, the orifice passage 60 is constituted. Therefore, the shape of the orifice passage 60 will be stably maintained even with respect to the input from the outside.

While the present invention has been described hereinabove in terms of a certain practical embodiment, this is merely exemplary, and the invention shall not be construed as limited in any way to the specific disclosures in the practical embodiment.

For example, the number, size, and the like of the central connector and the flexible wall provided to the side wall can be appropriately set according to the required vibration damping characteristics. Specifically, it would also be acceptable to provide the central connector and the flexible walls only to one axial side wall of the pocket. Besides, when one side wall is provided with the central connector and the flexible walls on opposite sides of the central connector, with respect to the other walls, the flexible wall may be formed on only one circumferential side of the central connector or the like, for example.

In the present invention, the technical effect as described above can be obtained by providing the thick central connector having a thickness dimension varied in the axial direction and the thin flexible walls to the side wall of the fluid chamber. In this respect, the specific wall thickness, shape and the like of the central connector and the flexible wall can be appropriately set according to the required vibration damping characteristics. It would be acceptable as long as the flexible wall is thinner than the central connector, and by setting the thickness dimension of the flexible wall so as to facilitate swelling deformation accompanying input of the vibration to be damped, desired working effects of the present invention described in the preceding practical embodiment can be exhibited.

In the preceding practical embodiment, the flexible walls 40, 40 are provided continuously on the circumferentially opposite sides of the central connector 38. However, it would also be possible for example to provide a transitional region or the like circumferentially between the central connector and the flexible wall with a prescribed circumferential dimension, the transitional region having a thickness dimension of an intermediate value between those of the central connector and the flexible wall, and smoothly connecting their inner and outer faces.

Moreover, the specific shape and structure of the orifice passage are set according to the required vibration damping characteristics, and are not limited in any way. Further, the orifice member is not essential in the present invention. For example, it would also be acceptable to provide a groove on the outer peripheral surface of the partition wall rubber through which the pair of pockets communicate with each other, and to form the orifice passage by covering the groove by the outer tube member.

It is also to be understood that the present invention may be embodied with various changes, modifications and improvements which may occur to those skilled in the art, without departing from the spirit and scope of the invention.

What is claimed is:

1. A fluid-filled tubular vibration-damping device comprising:
    an inner shaft member;
    an intermediate tube member spaced radially outward from the inner shaft member;
    a main rubber elastic body connecting the inner shaft member and the intermediate tube member;
    an outer tube member fastened externally onto the intermediate tube member;
    a pair of fluid chambers formed between the inner shaft member and the outer tube member, the fluid chambers being formed on opposite sides of the inner shaft member; and
    an orifice passage through which the fluid chambers are held in communication, wherein:
    in at least one of the fluid chambers, at least one side wall of side walls positioned on axially opposite sides includes:
        a thick central connector positioned in a circumferentially central portion of the at least one side wall and extending in an axis-perpendicular direction, and
        thin flexible walls that are thinner than the central connector while being positioned and spreading on circumferentially opposite sides of the at least one side wall,
    the at least one side wall of the at least one of the fluid chambers includes recesses that are positioned on the circumferentially opposite sides thereof and open to an axial outer face thereof, and the flexible walls are provided by the at least one side wall being thin-walled by the recesses, and
    an axial inner face of the at least one side wall spreads in a circumferential direction with an inner face shape that is constant over the central connector and the flexible walls.

2. The fluid-filled tubular vibration-damping device according to claim 1, wherein the flexible walls have a cross-sectional shape curving and extending in the axis-perpendicular direction between the inner shaft member and the outer tube member.

3. A fluid-filled tubular vibration-damping device comprising:
    an inner shaft member;
    an intermediate tube member spaced radially outward from the inner shaft member;
    a main rubber elastic body connecting the inner shaft member and the intermediate tube member;
    an outer tube member fastened externally onto the intermediate tube member;

a pair of fluid chambers formed between the inner shaft member and the outer tube member, the fluid chambers being formed on opposite sides of the inner shaft member; and an orifice passage through which the fluid chambers are held in communication, wherein:

in at least one of the fluid chambers, at least one side wall of side walls positioned on axially opposite sides includes:

a thick central connector positioned in a circumferentially central portion of the at least one side wall and extending in an axis-perpendicular direction, and thin flexible walls that are thinner than the central connector while being positioned and spreading on circumferentially opposite sides of the at least one side wall, and in both of the fluid chambers formed on the opposite sides of the inner shaft member, each of the side walls positioned on the axially opposite sides includes the central connector and the flexible walls.

4. A fluid-filled tubular vibration-damping device comprising:

an inner shaft member;

an intermediate tube member spaced radially outward from the inner shaft member;

a main rubber elastic body connecting the inner shaft member and the intermediate tube member;

an outer tube member fastened externally onto the intermediate tube member;

a pair of fluid chambers formed between the inner shaft member and the outer tube member, the fluid chambers being formed on opposite sides of the inner shaft member; and an orifice passage through which the fluid chambers are held in communication, wherein:

in at least one of the fluid chambers, at least one side wall of side walls positioned on axially opposite sides includes:

a thick central connector positioned in a circumferentially central portion of the at least one side wall and extending in an axis-perpendicular direction, and thin flexible walls that are thinner than the central connector while being positioned and spreading on circumferentially opposite sides of the at least one side wall, the intermediate tube member includes a pair of windows opening at portions that are opposed to each other in the axis-perpendicular direction in an axially middle portion of the intermediate tube member, the main rubber elastic body includes a pair of pockets opening to an outer circumferential surface of the intermediate tube member through the respective windows thereof, and the windows of the intermediate tube member are covered by the outer tube member so that the fluid chambers are provided by the pockets.

* * * * *